Sept. 21, 1965    R. A. JENNINGS    3,207,007
INDEXING DEVICES FOR MACHINE TOOLS
Filed April 30, 1963    6 Sheets-Sheet 3

Sept. 21, 1965   R. A. JENNINGS   3,207,007
INDEXING DEVICES FOR MACHINE TOOLS
Filed April 30, 1963   6 Sheets-Sheet 4

Sept. 21, 1965   R. A. JENNINGS   3,207,007
INDEXING DEVICES FOR MACHINE TOOLS

Filed April 30, 1963   6 Sheets-Sheet 6

United States Patent Office 3,207,007
Patented Sept. 21, 1965

3,207,007
INDEXING DEVICES FOR MACHINE TOOLS
Richard Arthur Jennings, Kenilworth, England, assignor to John Ackworthie Limited, Kenilworth, England, a British company
Filed Apr. 30, 1963, Ser. No. 276,955
Claims priority, application Great Britain, May 2, 1962, 16,791/62
7 Claims. (Cl. 74—820)

This invention relates to indexing devices for use in association with machine tools in order to move a workpiece through predetermined distances, from one definite index position or station to another, so that the workpiece may be subjected to successive operations.

An object of the invention is to provide an indexing device which has a rapid and efficient transport mechanism of simple form and which can readily be used with a variety of specific machine tools.

According to the invention, an indexing device is in the form of a self-contained unit comprising a housing or casing carrying a rotary work-table and containing a drive motor, worm and worm wheel gear mechanism arranged to transmit drive from the motor to a rotary shaft through an externally controllable clutch, "Geneva" mechanism index means actuated from the rotary shaft and arranged to move the rotary work-table intermittently between predetermined angular positions, releasable locking means arranged to locate positively the rotary work-table in each predetermined angular position, and associated release mechanism including cam means also actuated from said rotary shaft and arranged to effect automatically temporary release of the locking means whilst the work-table is rotated in synchronism with the operation of the "Geneva" mechanism.

The releasable locking means may comprise a spring-loaded plunger adapted to register with a series of angularly-spaced sockets in the work-table, the release means associated therewith being arranged to retract automatically the plunger out of engagement with the work-table during the rotation of the latter by means of a cam in engagement with a cam track fast with the rotary shaft.

By way of example, there is illustrated in the accompanying drawings one preferred embodiment of the invention in connection with an indexing device for a machine tool such as an automatic multiple head drilling and tapping machine intended to perform a plurality of successive operations on a workpiece. In said drawings, FIGURE 1 is a longitudinal vertical cross-sectional view;

Figure 1:
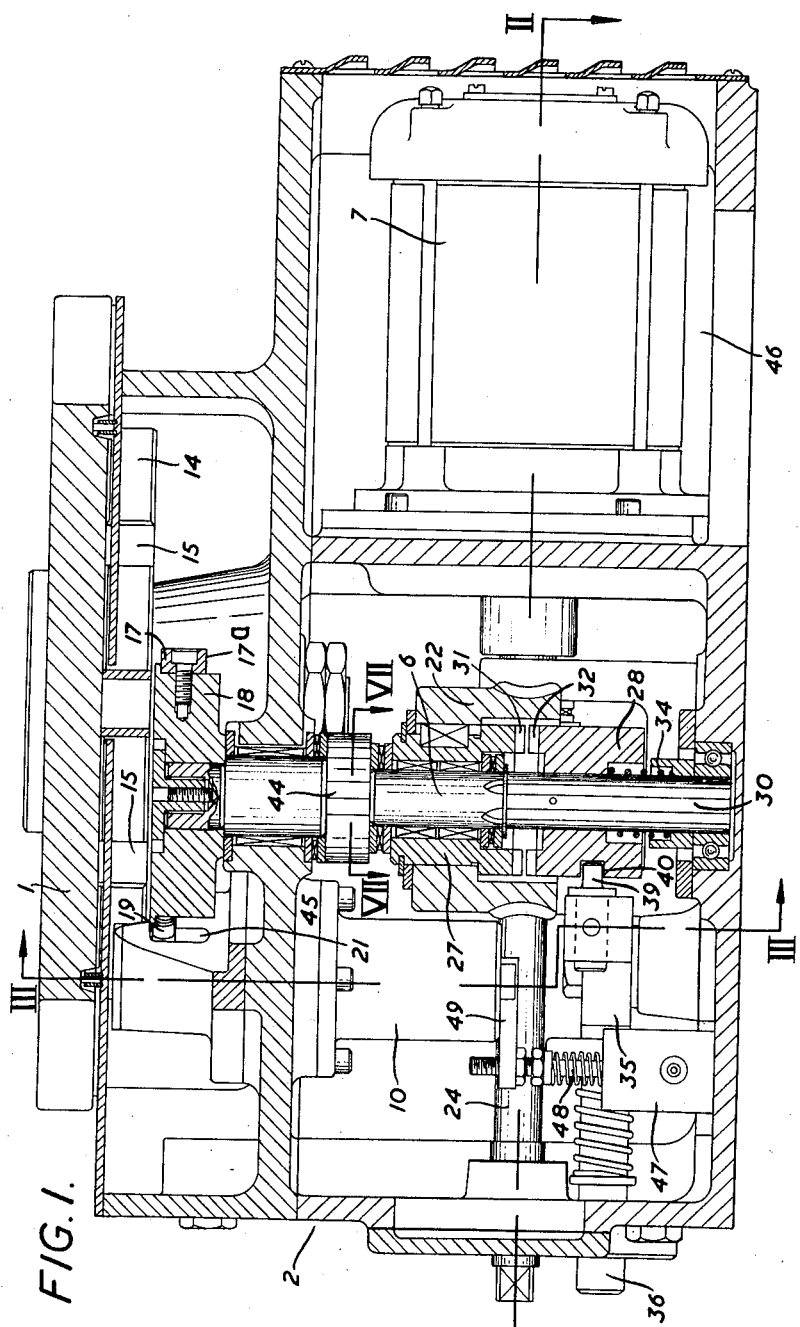
Figure 2:
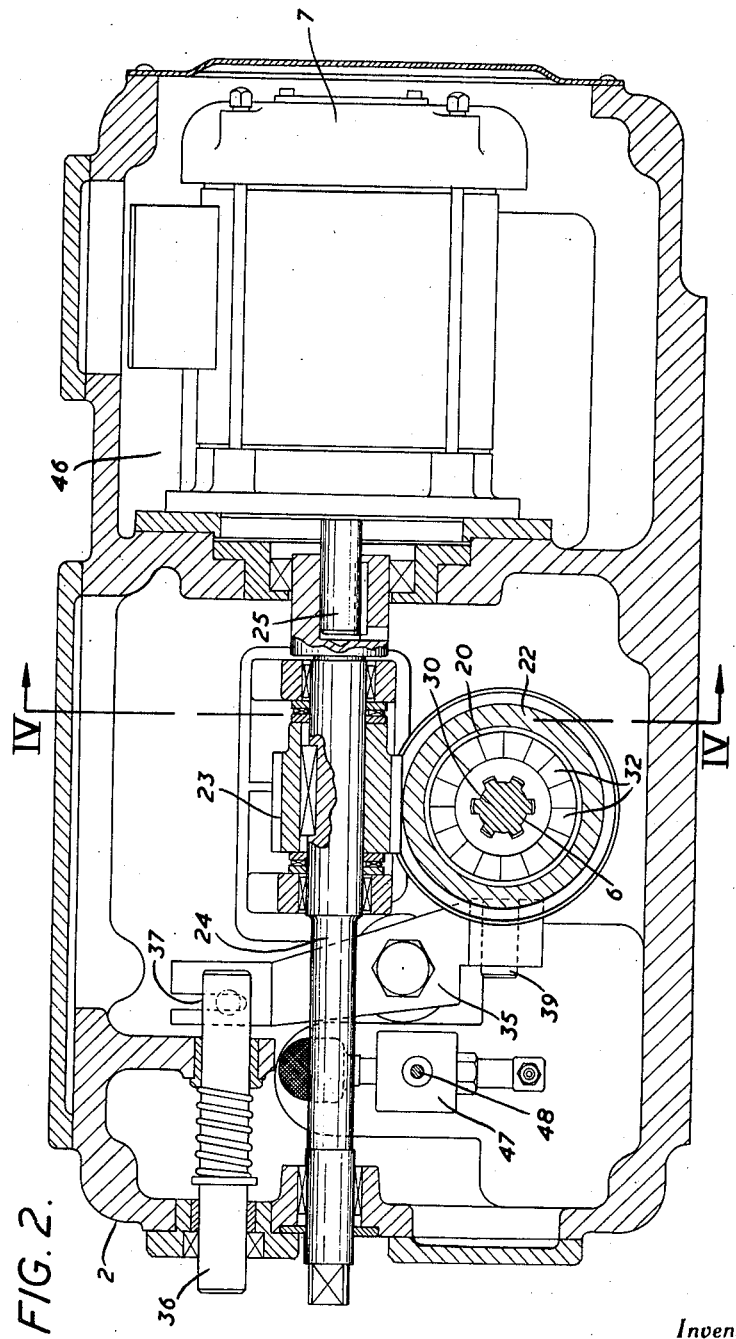
FIGURE 2 is a horizontal cross-section on line II—II of FIGURE 1.

Referring to the drawings, it will be seen that the indexing device is constructed in the form of a self-contained unit with a rotary work-table 1 carried by a box-like housing or casing 2 containing the drive mechanism for effecting intermittent rotary movement of said table 1 between successive predetermined angular positions.

The box-like housing or casing 2 of the unit is designed to be securely bolted or otherwise fixed to the machine tool and the mechanism will be described, for convenience, on the assumption that the unit is orientated so that the work-table 1 rotates in a horizontal plane as shown.

Figure 4:
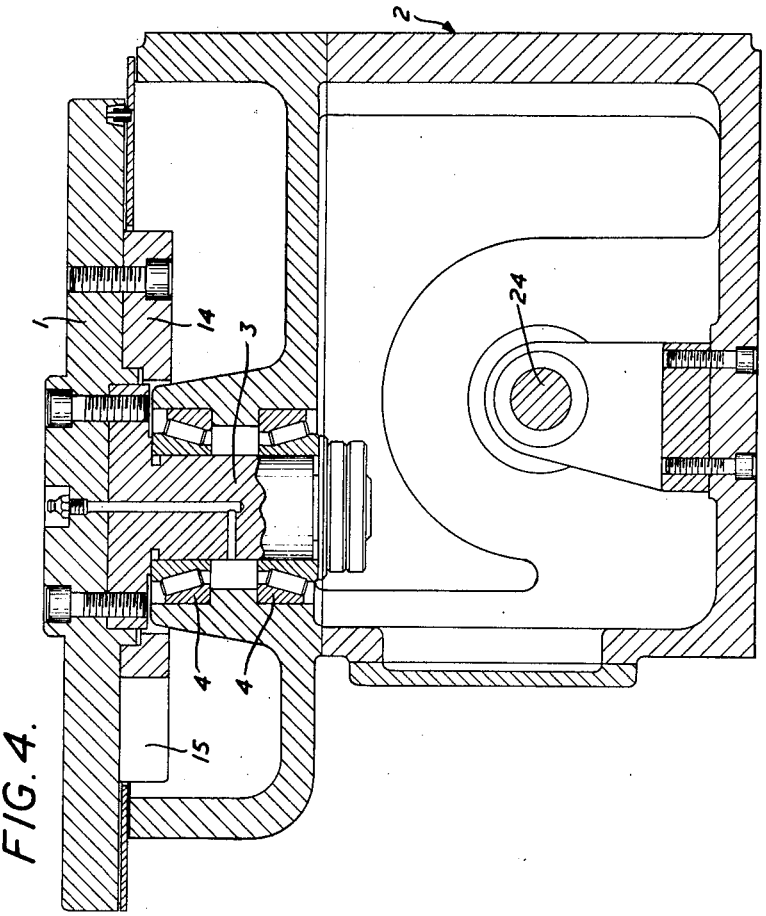
FIGURE 4 is a tranverse vertical cross-section on line IV—IV of FIGURE 2.

The work-table 1 itself is rotatably mounted by a carrier spindle 3 journalled in anti-friction bearings 4 in the upper part of the housing or casing 2 (see FIGURE 4), and the intermittent rotary drive is transmitted thereto by a "Geneva" mechanism from a rotary shaft 6 which is vertically mounted within the housing or casing and is arranged to be driven through a worm and worm wheel gear mechanism by a drive motor 7, as hereinafter described.

Figure 3:
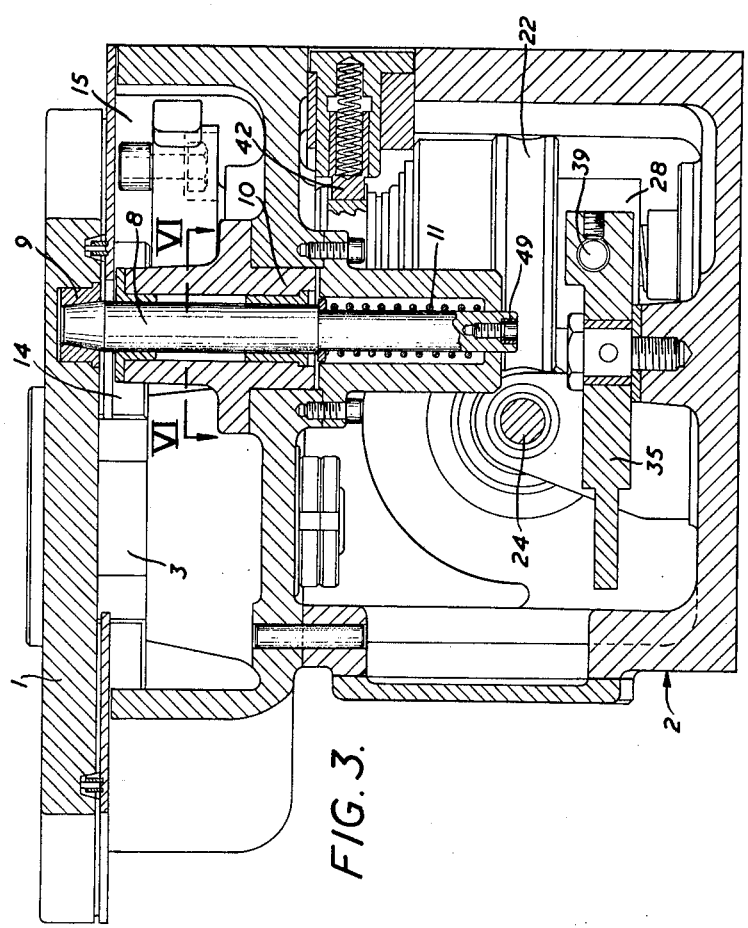
FIGURE 3 is a transverse vertical cross-section on line III—III of FIGURE 1.

For locking and locating positively the work-table 1 in each angular position, there is provided in this particular embodiment a spring-loaded plunger 8 of tapered form which co-operates with a series of complementary, angularly-spaced locating sockets 9 (one being shown in FIGURE 3) on the underside of the work-table 1, the plunger 8 engaging a different socket 9 in each predetermined angular position. This plunger 8 is conveniently slidably mounted within a sleeve 10 in the body of the housing or casing 2 and it is arranged to be automatically retracted out of engagement with the work-table, against the action of its biasing spring 11, in synchronism with the actuation of the "Geneva" mechanism when the work-table 1 is moved to a new index position.

Figure 5:
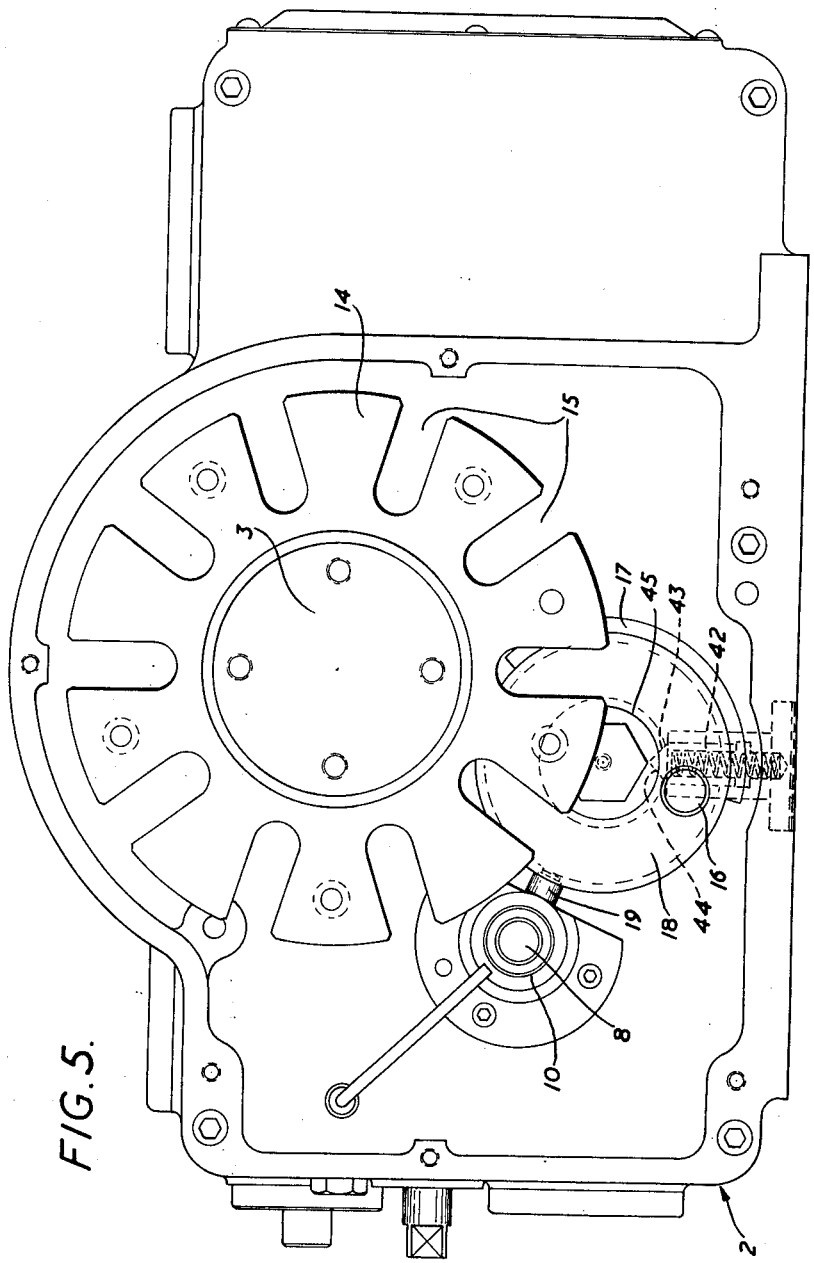
FIGURE 5 is a plan view with the top rotary work-table removed.
Figure 6:
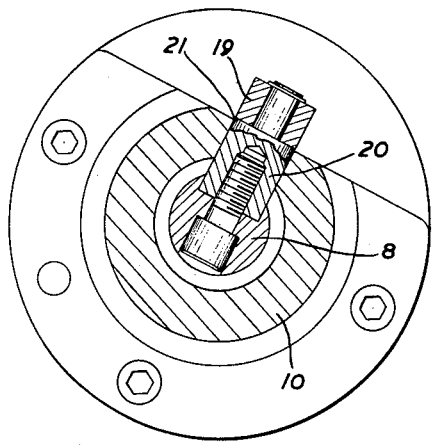
FIGURE 6 is a detail cross-sectional view line VI—VI of FIGURE 3.
Figure 7:
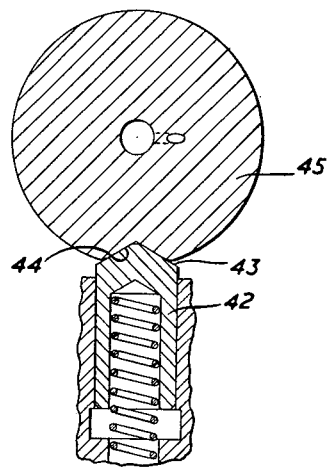
FIGURE 7 is a detail cross-sectional view on line VII—VII of FIGURE 1.

The "Geneva" mechanism comprises a "Geneva" index wheel 14 which is divided into a plurality of equal angular divisions, corresponding to the angular spacing between successive index positions of the work-table 1, by a series of equally-spaced open-ended radial slots 15 (see FIGURE 5) and it is bolted to the underside of the work-table 1, co-axially therewith. The "Geneva" wheel 14 has a radius substantially less than the radial displacement from the centre of the locating sockets 9 on the work-table and it is actuated by a co-operating upstanding drive pin 16 mounted eccentrically on the face of a disc 18 fast on the upper end of the aforesaid rotary shaft 6 so that for each revolution of the latter, the drive pin 16 enters one of the radial slots 15 and moves the "Geneva" index wheel 14 (and work-table 1) through one angular division, in known manner. At the same time, a cam surface 17a of a cam track 17 fitted around the periphery of the disc 18 co-operates with a cam follower roller 19 carried by a stud 20 fixed to the spring-loaded locking and locating plunger 8, this stud 20 extending laterally through a slot 21 in the mounting sleeve 10 (see FIGURE 6) and engaging the cam surface 17a so that the plunger 8 is caused to be retracted during the period of movement of the "Geneva" wheel 14 and work-table 1. When the work-table 1 has reached its new index position, the cam surface 17a of the track 17 allows the plunger 8 to rise again and engage the next corresponding locating socket 9 of the series.

Figure 8:
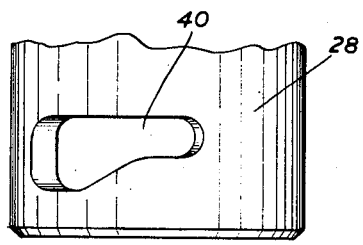
FIGURE 8 is a further detail elevational view.

The drive to the rotary shaft 6 from the drive motor 7, through the worm and worm wheel mechanism which comprises the worm wheel 22 and worm 23, is selectively applied by a clutch, in this instance a two-part dog clutch, which operates to lock the worm wheel 22 fast with the shaft 6. The worm wheel 22 is in constant mesh with the worm 23 which is carried on a shaft 24 directly coupled to the main drive shaft 25 of the motor 7 and it is keyed to an inner concentric clutch member 27 freely mounted for rotation upon the rotary shaft 6 in a fixed axial position. Beneath the worm wheel 22, a second clutch member 28 is slidably mounted on a splined lower end 30 of the rotary shaft 6, and opposed faces of the two clutch members 27 and 28 carry dog teeth 31, 32, which, when brought into engagement by raising the lower sliding clutch member 28, transmit the drive from the worm wheel 22 to the shaft 6. The sliding clutch member 28 is loaded by a spring 34 so as to be urged upwards into engagement but its axial position, and hence the operation of the clutch, is controlled by a pivoted lever 35 operable from outside the housing or casing 2 by a spring-loaded push button 36 coupled to its outer end, by a pin and slot connection 37. The inner end of the lever 35 carries a pin 39 which engages a slot 40 in the peripheral surface of the sliding clutch member 28 and normally maintains the latter in a retracted inoperative position. As shown in FIGURE 8, this slot 40 is widened out at one end and is arranged so that after release of the operating push-button 36, the pin 39 automatically re-enters the slot 40 and retracts the member 28 to disengage the clutch after a revolution of the shaft 6. For automatic operation, the externally-operable push-button 36 may be coupled to any appropriate electro-magnetic, pneumatic or mechanical actuating means associated with the machine tool.

In order to ensure that the rotary shaft 6 is brought quickly to rest and is held in a predetermined position in between indexing operations after each disengagement of the clutch, it is associated with a locking means comprising a spring-loaded plunger 42 having a V-shaped locating head 43 arranged to engage a complementary groove or recess 44 formed in the periphery of a circular boss 45 of the shaft 6, as shown most clearly in FIGURES 1, 3, 5 and 7.

To provide a convenient lubrication system, the drive motor 7 is isolated in a separate sealed compartment 46 within the main housing or casing 2, and the rest of the mechanism is fed with oil lubricant supplied under pressure by a pump 47 having an operating plunger 48 which is conveniently coupled through a connecting member 49 to the lower end of the spring-loaded locking and locating plunger 8 so that it is actuated during operation by the intermittent reciprocatory movement of the latter.

It will be understood that the above particular embodiment has been described only by way of example and many detail modifications may be made within the scope of this invention. The particular number of index positions will, of course, be selected according to circumstances and if desired, the device can be adapted for "double indexing" when two workpieces are mounted on the work-table and are subjected to similar operations simultaneously, the table then being arranged to move through two index positions at each movement.

I claim:

1. An indexing device in the form of a self-contained unit comprising a housing, a drive motor contained within said housing, a rotary shaft within said housing, an externally-controllable clutch associated with said rotary shaft, worm and worm wheel gear mechanism arranged to transmit drive from said drive motor to said rotary shaft through the externally-controllable clutch, a rotary work-table carried by said housing, "Geneva" mechanism index means actuated from said rotary shaft and arranged to move said rotary work-table intermittently between predetermined angular positions, releasable locking means arranged to locate positively the rotary work-table in each predetermined angular position and associated release mechanism including cam means also actuated from said rotary shaft and arranged to effect automatically temporary release of the locking means whilst the work-table is rotated in synchronism with the operation of the "Geneva" mechanism.

2. An indexing device according to claim 1, in which the releasable locking means comprises a spring-loaded locking and locating plunger adapted and arranged to register with a series of angularly-spaced sockets in the work-table.

3. An indexing device according to claim 2, in which the release mechanism includes a cam track fast with said rotary shaft and a cam in engagement with said cam track which is arranged to retract automatically the locking and locating plunger from out of engagement with the work-table during the rotation of the latter.

4. An indexing device according to claim 3, including means for automatically disengaging the externally-controllable clutch after one revolution of the rotary shaft following initial engagement by operation from outside of the housing of its associated control means.

5. An indexing device in the form of a self-contained unit comprising a housing, a drive motor contained within a separate sealed compartment of said housing, a rotary shaft within said housing, an externally-controllable clutch associated with said rotary shaft, worm and worm gear mechanism arranged to transmit drive from said drive motor to said rotary shaft through the externally-controllable clutch, a rotary work-table carried by said housing, "Geneva" mechanism index means actuated from said rotary shaft and arranged to move said rotary work-table intermittently between predetermined angular positions, said "Geneva" mechanism including a radially-slotted "Geneva" index wheel fast with the rotary work-table and a co-operating drive pin carried eccentrically by the rotary shaft, releasable locking means arranged to locate positively the rotary work-table in each predetermined angular position, said releasable locking means comprising a spring-loaded locking and locating plunger adapted and arranged to register with a series of angularly-spaced sockets in the rotary work-table, release mechanism associated with said releasable locking means including a cam means also actuated from said rotary shaft and arranged to effect automatically temporary release of said locking means whilst the work-table is rotated in synchronism with the operation of the "Geneva" mechanism, and a force-fed lubrication system for the drive and indexing mechanism including a lubricant pump operatively-connected to and actuated by the aforesaid spring-loaded locking and locating plunger.

6. An indexing device according to claim 5, further comprising a spring-loaded locking member associated with said rotary shaft and arranged to bring the latter to rest in a predetermined position after removal of the drive by disengagement of the said externally-controllable clutch.

7. An indexing device according to claim 6, in which the release mechanism associated with the releasable locking means comprises a cam track fast with the rotary shaft and a cam engaging said cam track which cam retracts automatically the locking and locating plunger from out of engagement with the work-table during the rotation of the latter.

References Cited by the Examiner

UNITED STATES PATENTS 3,116,593   1/64   Van Horn _____ 74—820 X
3,136,168   6/64   Ma Tovich _____ 74—820 X BROUGHTON G. DURHAM, *Primary Examiner.*